United States Patent [19]

Ruschhaupt, Jr.

[11] Patent Number: 4,878,598
[45] Date of Patent: Nov. 7, 1989

[54] METHOD AND APPARATUS FOR DISPENSING A SUBSTANCE TO A WORK AREA

[75] Inventor: Dolph W. Ruschhaupt, Jr., Fresno, Calif.

[73] Assignee: California Fresno Transportation, Inc., Fresno, Calif.

[21] Appl. No.: 44,302

[22] Filed: Apr. 30, 1987

[51] Int. Cl.⁴ ............................................. G01F 11/00
[52] U.S. Cl. ........................................ 222/1; 222/63;
222/64; 222/71; 222/626; 222/617; 222/613;
239/156; 239/159; 239/172; 118/679; 118/305;
427/136; 427/421
[58] Field of Search ............... 222/626, 613, 617, 628,
222/608, 1, 63, 64, 67, 71; 239/63, 71, 664, 670,
677, 156, 157, 159, 164, 172, 176, 1;
427/136–139, 8, 421; 118/668, 679, 680, 683,
684, 696, 708, 305, 307

[56] References Cited

U.S. PATENT DOCUMENTS

| | | |
|---|---|---|
| 3,241,976 | 3/1966 | Rank et al. |
| 3,356,261 | 12/1967 | Stein |
| 3,807,634 | 4/1974 | Vogt .................................... 239/150 |
| 4,012,160 | 3/1977 | Parker ................................... 404/84 |
| 4,390,304 | 6/1983 | Jacobson, Jr. et al. ............. 404/110 |
| 4,392,611 | 7/1983 | Bachman et al. ................ 222/613 X |
| 4,473,319 | 9/1984 | Spangler .............................. 404/72 |
| 4,523,280 | 6/1985 | Bachman ........................ 222/613 X |
| 4,553,702 | 11/1985 | Coffee et al. .................... 239/159 X |

FOREIGN PATENT DOCUMENTS 3446471 3/1986 Fed. Rep. of Germany ...... 239/677

OTHER PUBLICATIONS

Brochure "Bearcat CRC", Bearcat Manufacturing, Inc., 1986.

Primary Examiner—Joseph J. Rolla
Assistant Examiner—David H. Bollinger
Attorney, Agent, or Firm—Worrl & Worrel

[57] ABSTRACT

A method and apparatus for dispensing a substance to a work area in which the method includes the steps of determining the quantity of the substance to be dispensed substantially evenly to the work area, calculating the rate of dispensing the substance to the work area for the quantity determined in the determining step to achieve substantially even dispensing, dispensing the substance to the work area at the calculated rate during movement over the work area, and adjusting the rate of dispensing at intervals during such movement to minimize error in such dispensing. The apparatus has a source of the substance to be dispensed, a dispensing mechanism for dispensing the substance from the source to a work area during movement thereover, a control mechanism operable to control the rate of dispensing the substance from the source, and a control system operable to detect the quantity of substance remaining in the source at intervals during movement over the work area and to adjust the rate of such dispensing so that the substance can be substantially evenly dispensed to said work area.

5 Claims, 2 Drawing Sheets

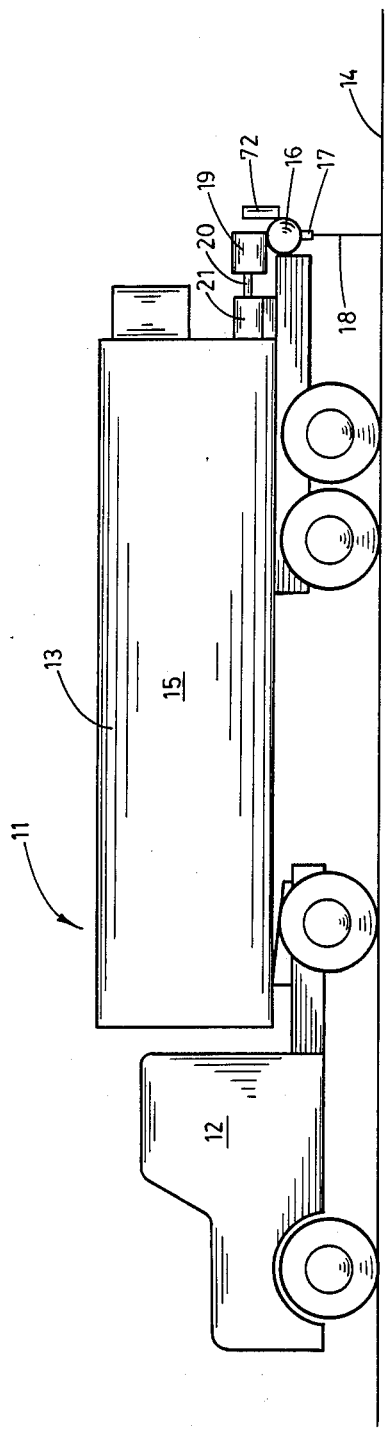
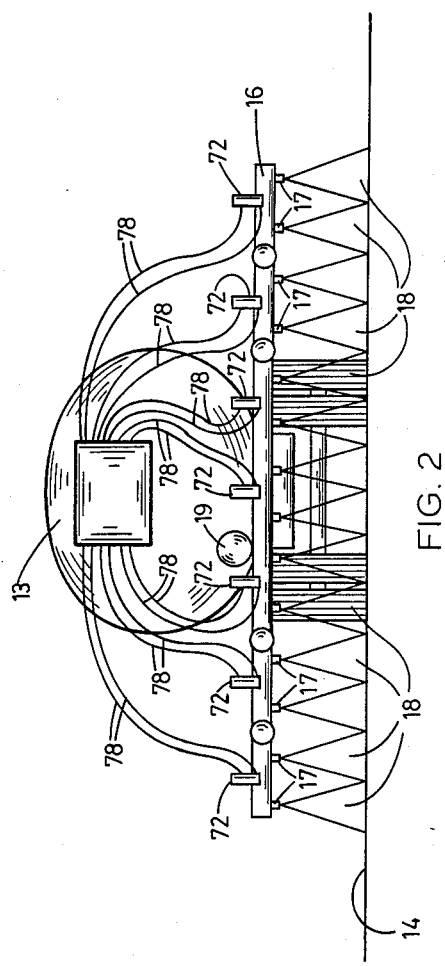

METHOD AND APPARATUS FOR DISPENSING A SUBSTANCE TO A WORK AREA

BACKGROUND OF THE INVENTION

1. Field of the Invention:

The present invention relates to a method and apparatus for dispensing a substance to a work area and more particularly to such a method and apparatus which are particularly well suited to applying a flowable substance, such as oil or the like, to a given surface area, such as a road surface, wherein there is an optimum application to be dispensed evenly over the surface area and wherein a multitude of variables conventionally prevent such optimum application where conventional application equipment is concerned.

2. Description of the Prior Art:

There are innumerable situations in which the application of substance to work areas requires that the quantity of the substances to be applied at any given point within the work area be substantially the same as at every other point within the work area and that the total quantity applied to the entire work area be of a specified amount. Thus, if the quantity applied at any given point is greater or less than the optimum or if the quantity applied to the total area is greater or less than the optimum, the desired result will not be achieved and, depending upon the particular substance involved, damage may result.

For example, in the spraying of agricultural chemicals such as herbicides, pesticides and the like, it is essential that as near the precise quantity as intended actually be applied, both in terms of the per square foot or square yard area and in terms of the total area. This is, of course, true whether the method of application is by aircraft or by ground vehicle. The same requirements exist for other agricultural chemicals.

Similarly, the application of oil to road surfaces is, if done properly, an exacting operation requiring that the oil be applied evenly within the recommended tolerances and as to the total quantity designated for the particular work area involved. There are countless other environments where these same requirements exist.

Notwithstanding the recognition that these criteria exist, conventional methods of application have virtually insured that these criteria can seldom if ever be met. Conventional practice, regardless of the substance being applied, has been to determine what quantity of substance should at optimum be applied to the total area or on a square foot basis within the total area and then to calculate, depending upon the foregoing, the total quantity to be applied to the area on a square foot basis. Depending upon the equipment being used, the operator then simply fills the storage tank with the quantity of the substance designated and sets the control mechanism, such as a control valve, to discharge the designated quantity on a square foot basis as designated by such other variables as the velocity of movement over the work area, the amount of overlap in passes over the work area and the like.

While theoretically subsequent application of the substance using this method should produce the desired result, this is virtually never achieved. There are many variables which interplay to prevent the optimum application, both as to square foot application and as to the total area. It may be impossible to maintain the predesignated speed of movement over the work area. The control system, such as a control valve, may be incapable of maintaining the preset discharge rate. The release nozzles may clog or release the substances at variable rates over time or at variable rates among themselves. The quantity of the substance within the storage tank may influence the rate of release as the volume diminishes. Shifting or flowing of the substance within the storage tank and conduits due to changes in the velocity or the attitude of the transporting vehicle can affect the rate of discharge. All of these factors and many others insure that the predesignated criteria are seldom if ever met using conventional methods and apparatus.

Therefore, it has long been known that it would be desirable to have a method and apparatus for dispensing a substance to a work area which can operate substantially more accurately than has heretofore been possible to dispense substances to a work area nearly precisely in accordance with the predesignated criteria; which is capable of adjusting to the multitude of variables influencing the dispensing of the substance during passage over the work area; and which is capable of operating at minimal expense and maximum dependability insuring that the cost of the application is otherwise maintained at a minimum by insuring that only the designated quantity of the substance is dispensed.

SUMMARY OF THE INVENTION

Therefore, it is an object of the present invention to provide an improved method and apparatus for dispensing a substance to a work area.

Another object is to provide such a method which is capable of controlling the application of a substance to a work area in substantially precise according with the preselected criteria, both as to the area on a square foot basis and as to the total work area.

Another object is to provide such a method which can adjust to the multitude of variables influencing the dispensing of the substance during passage over the work area to maximize the accuracy with which the substance is dispensed throughout the dispensing operation.

Another object is to provide such a method which is capable of adjusting automatically throughout the dispensing operation to leave the operator available for other concerns.

Another object is to provide such a method which is capable of maintaining the cost of applying substances to a work area to a minimum by insuring that substantially only the predesignated quantity of the substance is applied to the work area.

Another object is to provide such a method which is operable to insure that substantially only the desired result is achieved by application of the substance thus minimizing the possibility of damage or ineffectual results occurring due to application of other than the predesignated quantity.

Another object is to provide such a method which is applicable virtually to any and all situations in which a flowable substance is to be applied to a work area.

Another object is to provide an apparatus which is particularly well suited to the practice of the method of the present invention by insuring that the steps of the method can be carried out with a precision and dependability required for optimum practice of the method hereof.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is a side elevation of a vehicle mounting the apparatus of the present invention and operable to perform the method of the present invention, thus showing the invention hereof in a typical operative environment.

FIG. 2 is a rear elevation of the vehicle shown in FIG. 1.

DESCRIPTION OF THE PREFERRED EMBODIMENT APPARATUS

Figure 3:
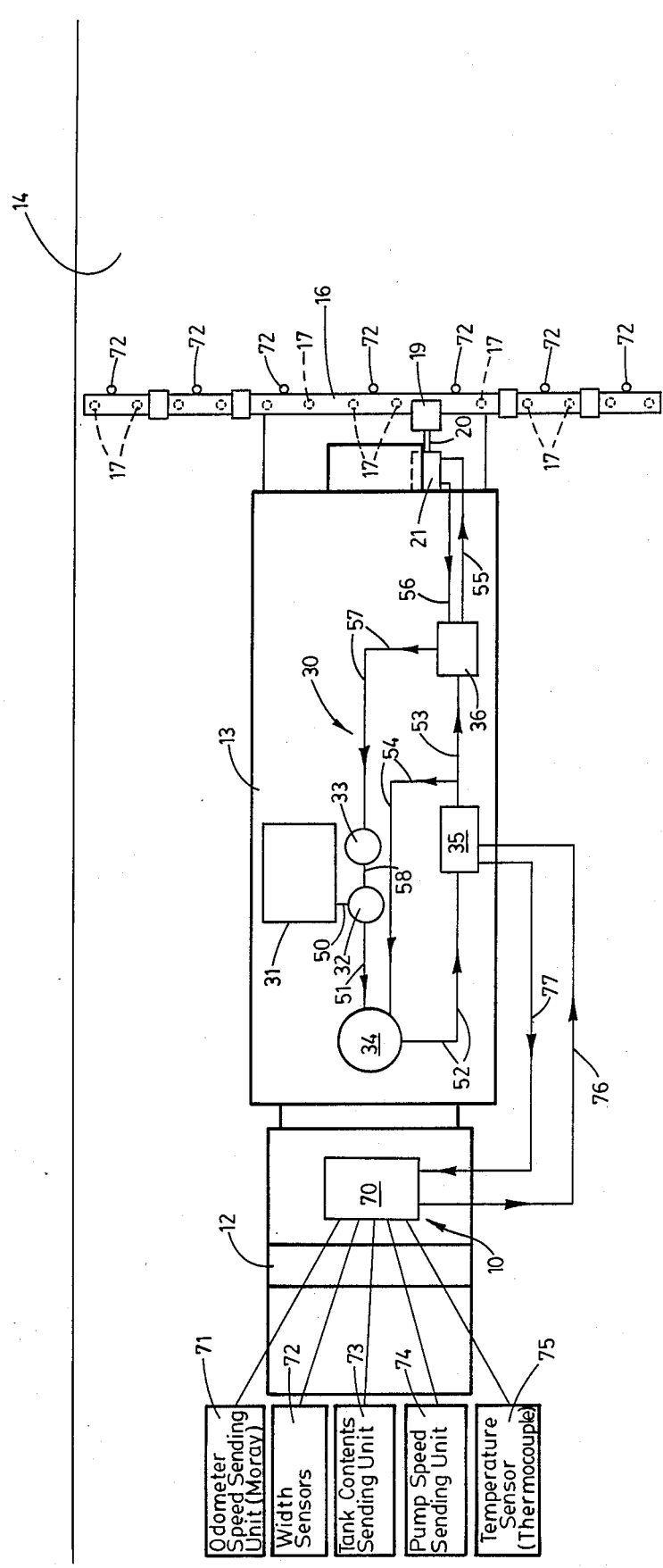
FIG. 3 is a diagrammatic top plan view of the apparatus of the present invention overlaying in top plan view the vehicle of FIG. 1 for illustrative convenience.

Referring more particularly to the drawings, the apparatus of the present invention operable in practicing the method hereof is generally indicated by the numeral 10 in FIG. 3. It will be seen that the method and apparatus of the present invention have application to a wide assortment of areas of application including the ground and aerial application of agricultural chemicals, the application of oil to road surfaces and virtually any use wherein a flowable substance is to be appled to a work area. The operative environment shown herein has been selected only for purposes of illustrative convenience.

The apparatus 10 is shown in the drawings in a typical operative environment in which it would be operated in the practice of the method of the present invention. In this environment, as best shown in FIG. 1, a tank truck 11 consists of a tractor 12 connected in towing relation to a tank trailer 13. The tank truck is disposed for earth traversing movement over a work area or road surface 14.

The tank trailer 13 has a source of a substance to be dispensed or tank 15. The tank 15 is connected in fluid supplying relation through a spray manifold 16 to a plurality of spray nozzles 17 borne by the spray manifold. The spray manifold is operable to discharge the substance housed in the tank in spray patterns 18 individual to the spray nozzles. The spray manifold is operably connected to the tank through a pump 19 driven by a drive shaft 20 from an hydraulic motor 21. The hydraulic motor 21 is operable to drive the pump 19 to pump the flowable substance, in this case road oil, along a conduit not shown to the spray manifold 16 in feeding relation to the spray nozzles 17.

The apparatus 10 has an hydraulic system generally indicated by the numeral 30 and shown diagrammatically in FIG. 3. The hydraulic system, in this instance, is a closed loop load and pressure compensating hydraulic system, but other types of hydraulic systems can be employed. The hydraulic system includes an hydraulic fluid reservoir 31, a booster valve 32, a filter 33, an hydraulic pump 34, a proportional valve 35 and a forward/reverse valve 36. The reservoir 31 is operably connected to the booster valve 32 in hydraulic fluid supplying relation by an hydraulic conduit 50. An hydraulic conduit 51 operably interconnects the booster valve 32 and the hydraulic pump 34. An hydraulic conduit 52 operably interconnects hydraulic pump 34 and proportional valve 35. An hydraulic conduit 53 operably interconnects the proportional valve 35 and the forward/reverse valve 36. An hydraulic conduit or sense line 54 operably interconnects hydraulic conduit 53 and the hydraulic pump 34. An hydraulic conduit 55 operably interconnects the forward/reverse valve 36 and the hydraulic motor 21. An hydraulic conduit 56 operably interconnects the hydraulic motor 21 and the forward/reverse valve 36. An hydraulic conduit 57 operably interconnects the forward/reverse valve 36 and the filter 33. An hydraulic conduit 58 operably interconnects the filter 33 and the booster valve 32. The hydraulic system 30 is charged with hydraulic fluid and is operable to drive the pump 19 to pump the flowable substance, in this case road oil, from the tank 15 to the spray manifold 16.

The apparatus 10 has a computer or microprocessor 70 preferably located in the cab of the tractor 12 of the tank truck 11. Preferably the microprocessor has a monitor, not shown, in the cab, to display the information required for operation of the apparatus and a keyboard, also not shown, for use by the operator in inputting into the microprocessor the information required for operation of the apparatus 10 in the practice of the method of the present invention.

Operably connected to the microprocessor 70 through electrical conduits and related electronic equipment, not shown, are a number of sensing units. It will be understood that not all of the sensing units hereinafter described need be included in the apparatus 10 for practice of the method of the present invention. Conversely, it is entirely within the scope of the present invention to include other types of sensing units, or alternative types of sensing units in substitute for those herein identified without departing from the scope of the present invention.

As diagrammatically illustrated in FIG. 3, the apparatus 10 includes an odometer speed sending unit 71 connected in feeding relation to the microprocessor 70. While other types of odometer speed sending units 71 can be employed, a sending unit of the moray type is preferred. The apparatus 10 has a plurality of width sensors 72 which are mounted in operative position on the spray manifold 16 on the right in FIG. 3, but are also diagrammatically represented on the left in FIG. 3 in operable connection with the microprocessor 70 for illustrative convenience. The apparatus 10 has a tank contents sending unit 73 operably connected to the microprocessor 70. The tank contents sending unit can be of any suitable type as may be desired, including a rheostat, float, or weight sensor. The apparatus 10 has a pump speed sending unit 74 operably connected to the microprocessor and operable to detect the speed of operation of the pump 19. Still further, the apparatus 10 has a temperature sensor 75, in this case preferably a thermocouple, operably connected to the microprocessor 70. The temperature sensor is operable to register the temperature of the road oil at any suitable location as an index of the viscosity, or flowability of the road oil.

The microprocessor 70 is operably connected to the proportional valve 35 by electrical conductors 76 and 77 in such a manner as to be capable of controlling the rate of flow of hydraulic fluid therethrough and thereby the speed of operation of the pump 19. Electrical conductors 78 operably interconnect the microprocessor and each of the width sensors 72.

METHOD

As previously discussed, the apparatus 10 has particular utility in the practice of the method of the present invention. However, the method can be practiced using a variety of different apparatuses. The particular apparatus most suited to the practice of the method depends upon the particular environment in which it is to be employed and upon the requirements or preferences of the operator. The apparatus 10 is most suited to practice of the method in the application of oil to road surfaces and it is used herein only for illustrative convenience in describing the method hereof.

The method of the present invention involves the steps of determining the quantity of the substance to be dispensed; calculating the rate of dispensing the substance to the work area for the quantity determined in the determining step to achieve substantially even dispensing to the work area; dispensing the substance to the work are at the calculated rate during movement over the work area; and adjusting the rate of dispensing at intervals during movement over the work area. More particularly, the method preferably employs a step at each interval and prior to adjusting of calculating, during movement over the work area, the quantity of the substance remaining to be dispensed and the error, if any, which has occurred and then employing this information in making the adjustment.

These calculations and operations can be performed by a variety of different means and apparatuses depending upon the needs of the particular operation being performed. Thus, for example, the requirements for the aerial application of agricultural chemicals may be different from those for the application of oil to road surfaces. The calculations and controls can be performed manually, or by computer, or by any other suitable means.

As previously noted, the apparatus 10 has been chosen for illustrative convenience to show one work environment. The tank 15 of the tank trailer 13 is filled with the substance to be dispensed, in this case road oil. More specifically, the tank can either be filled to capacity or can be filled with a predetermined quantity of road oil to be dispensed. The other systems of the tank truck 11 are placed in operational condition and the tank truck is driven to the site at which the operation is to be performed. The tank truck is positioned relative to the road surface 14 to which road oil is to be applied as shown in FIGS. 2 and 3 and the spray nozzles 17 are adjusted for full lateral coverage of the road surface as the tank truck passes along the road surface Using the microprocessor 70, the operation of the tank truck 11 inputs into the microprocessor the area of the road surface 14 to be covered with the quantity of oil within the tank 15. More specifically, the operator of the vehicle will be assigned, when directed to the job site, the task of applying road oil to a given length of road surface at a given rate of coverage. Alternatively, the operator may be directed to apply a given quantity of road oil from the tank to a given length to road surface. Still another possibility is that the operator will be directed to apply the quantity of road oil in the tank at a given rate of coverage to as much as the road surface as can be covered. In any case, depending upon his instructions, he inputs into the microprocessor the information he has been given. The computer program of the microprocessor then calculates and displays for the operator the information needed to complete the assignment. By way of illustration, if the operator has been directed to apply the quantity of road oil in the tank at a given rate of coverage to as much of the road surface as can be covered, the computer program will calculate and display at the operator's command the theoretical area of the road surface that can be covered with that quantity of oil.

Once the information has been inputted into the microprocessor 70 and the computer program has made the calculations, the microprocessor automatically or at the operator's command, depending upon the computer program, adjusts the proportional valve 35 to a predetermined setting. This is achieved by the pump speed sending unit 74 which thereafter operates automatically to adjust the proportional valve 35 as controlled by the microprocessor. The setting is operable to cause the hydraulic system 30 to drive the pump 19 to pump oil from the tank 15 at a speed such that the spray manifold 16 discharges the oil from the spray nozzles 17 to apply oil to the road surface at a given rate of coverage or application. Thus, as will be seen in greater detail, the pump speed sending unit 74 operates automatically at regular intervals to adjust the rate of application through its control of the proportional valve and under control of the microprocessor.

It will be apparent, however, that other factors influence the rate of application as well. Thus, the odometer speed sending unit 71 tells the microprocessor what speed the tank truck 11 is traveling. The width sensors 72 constantly monitor the spray nozzles 17 and report to the microprocessor whether or not each of the spray nozzles is working properly, or, in other words, if the rate of flow from each nozzle is as intended. The tank contents sending unit 73 continually tells the microprocessor what quantity of oil is in the tank as the oil is pumped from the tank. The temperature sensor continually registers the temperature of the oil and reports to the microprocessor on a continuing basis. The temperature of the oil, of course, affects its viscosity and thereby the rate at which the oil can be applied for a given setting.

With all of these systems operating, the microprocessor 70 is capable of using the information provided to recalculate what the speed of operation of the pump 19 should be to achieve the desired rate of application. Through the operation of the pump speed sending unit 74 already described, the microprocessor is also capable of readjusting the speed of operation of the pump and thereby adjusting or maintaining the rate of application not withstanding changes in the variables being monitored.

In the practice of the method of the present invention, the operator drives the tank truck 11 along the road surface 14, preferably at a constant predetermined rate of speed. During such passage over the road surface, the microprocessor at very frequent intervals performs the calculations, using its computer program, hereinafter to be described. The frequency with which these calculations are performed may vary with the wishes of those involved. However, the applicant has found that making these calculations six times every minute during passage over the road surface works quite successfully.

The calculations performed by the microprocessor 70 at each interval, or, in other words, six times each minute are as follows. The microprocessor calculates: (1) how far the tank truck has traveled along the road surface; (2) how many gallons of oil have been used; (3) how many gallons should have been used for the preselected rate of application; (4) the percentage difference between how many gallons were used, and how many gallons should have been used; (5) the amount of road surface remaining to be done; and (6) the number of gallons remaining to cover the remaining area. Using these calculations, the microprocessor then calculates a new application rate to cover the remaining road surface and multiplies that new rate by the percentage that the apparatus was in error previously calculated and noted at item number 4 above. Through the pump speed sending unit 74, the microprocessor 70 then adjusts the speed of operation of the pump 19 thereby adjusting the rate of application of the oil by the spray manifold 16.

Since the foregoing operations are performed, in the described embodiment, six times per minute, such adjustment of the rate of application is virtually constant and consequently the degree of adjustment at each interval is very small. Similarly, the correlation between the preselected criteria for application to the road surface and what is actually achieved in the application process is extremely great. In other words, using the method of the present invention, a precision is achieved not heretofore possible.

Therefore, the method and apparatus of the present invention operate substantially more accurately than has heretofore been possible to dispense substances to a work area nearly precisely in accordance with the predesignated criteria, are capable of adjusting to the multitude of variables influencing the dispensing of the substance during passage over the work area; and are capable of operating at minimal expense and maximum dependability insuring that the cost of the application is otherwise maintained at a minimum by insuring that substantially only the designated quantity of the substance is dispensed.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A method for dispensing a substance to a work area comprising the steps of:
   A. determining the quantity of the substance to be dispensed to said work area;
   B. dispensing said substance to the work area during movement thereof; and
   C. at intervals during said movement thereof:
      1. calculating during said movement the quantity of said substance remaining to be dispensed,
      2. calculating the portion of said area remaining to have substance dispensed thereto at said intervals, and
      3. adjusting the rate of said dispensing at said intervals to correspond to the quantity of the substance remaining to be dispensed by comparing at said intervals the quantity of said substance remaining to be dispensed calculated in the first of said calculating steps with the portion of said area remaining to have said substance dispensed thereto calculated in the second of said calculating steps and adjusting the rate of said dispensing so that said quantity remaining of said substance will be substantially evenly dispensed over said work area.

2. The method of claim 1 wherein step C. is performed frequently and at substantially equal intervals during said dispensing so that adjustment of the rate of said dispensing is sufficiently frequent and evenly performed during said movement over the work area to minimize the error in said dispensing as compared with the quantity of the substance to be dispensed to said work area determined in said determining step.

3. A method for dispensing a substance to a work area comprising the steps of:
   A. dispensing said substance to the work area during movement thereof; and
   B. during said movement thereof;
      1. calculating the quantity of said substance remaining to be dispensed,
      2. calculating the portion of said area remaining to have substance dispensed thereto,
      3. comparing the quantity of said substance remaining to be dispensed calculated in the first of said calculating steps with the portion of said area remaining to have said substance dispensed thereto calculated in the second of said calculating steps, and
      4. adjusting the rate of said dispensing for substantially even dispensing of said remaining substance over the remaining work area in accordance with the comparison of the remaining quantity and remaining area.

4. The method of claim 3 wherein step B is performed at intervals during said movement over the work area.

5. The method of claim 4 wherein said intervals of the performance of step B are frequent and substantially equal during said movement over the work area.

* * * * *

UNITED STATES PATENT AND TRADEMARK OFFICE
CERTIFICATE OF CORRECTION

PATENT NO. : 4,878,598

DATED : November 7, 1989

INVENTOR(S) : Dolph W. Ruschhaupt, Jr.

It is certified that error appears in the above-identified patent and that said Letters Patent is hereby corrected as shown below: On the title page:

Under "OTHER PUBLICATIONS", the Attorney, Agent, or Firm should read as follows: "Worrel & Worrel"

Column 1, line 19, delete "substance" and substitute ---substances---.

Column 1, line 20, delete "substances" and substitute ---substance---.

Column 2, line 34, delete "according" and substitute ---accordance---.

Column 5, line 46, after "surface" add ---.---

Column 7, line 47, delete "thereof" and substitute ---thereover---.

Column 8, line 27, delete "thereof" and substitute ---thereover---.

Column 8, line 28, delete "thereof" and substitute ---thereover---.

Signed and Sealed this

Twenty-fifth Day of September, 1990

Attest:

HARRY F. MANBECK, JR.

*Attesting Officer*     *Commissioner of Patents and Trademarks*